United States Patent [19]
Maas

[11] Patent Number: 5,978,868
[45] Date of Patent: Nov. 2, 1999

[54] SYSTEM FOR GENERATING BUFFER STATUS FLAGS BY COMPARING READ AND WRITE POINTERS AND DETERMINING DIRECTION OF PROGRESSION OF READ POINTER WITH RESPECT TO WRITE POINTER

[75] Inventor: Michael F. Maas, West St. Paul, Minn.

[73] Assignee: Cypress Semiconductor Corp., San Jose, Calif.

[21] Appl. No.: 08/919,653

[22] Filed: Aug. 28, 1997

[51] Int. Cl.⁶ .................................................. G06F 13/10
[52] U.S. Cl. .............................. 710/52; 710/57; 710/15; 709/234
[58] Field of Search ........................ 395/872, 393, 395/386; 711/156; 375/214, 4; 370/465, 506; 365/200, 221, 189.07, 189.04, 238; 345/335; 710/52, 57, 15; 712/17, 210; 709/234

[56] References Cited

U.S. PATENT DOCUMENTS

| | | | |
|---|---|---|---|
| 4,839,893 | 6/1989 | Smith | 370/506 |
| 4,864,643 | 9/1989 | Ward et al. | 365/221 |
| 4,945,548 | 7/1990 | Iannarone et al. | 375/214 |
| 4,965,794 | 10/1990 | Smith | 370/506 |
| 5,084,841 | 1/1992 | Williams et al. | 365/189.07 |
| 5,339,418 | 8/1994 | East et al. | 395/680 |
| 5,349,683 | 9/1994 | Wu et al. | 371/44 |
| 5,365,485 | 11/1994 | Ward et al. | 365/221 |
| 5,384,744 | 1/1995 | Lee | 365/221 |
| 5,414,455 | 5/1995 | Hooper et al. | 348/7 |
| 5,426,756 | 6/1995 | Shyi et al. | 395/425 |
| 5,471,591 | 11/1995 | Edmondson et al. | 395/393 |
| 5,555,524 | 9/1996 | Castellano | 365/221 |
| 5,594,702 | 1/1997 | Wakeman et al. | 365/230.05 |
| 5,617,418 | 4/1997 | Shirani et al. | 370/465 |
| 5,623,449 | 4/1997 | Fischer et al. | 365/200 |
| 5,627,979 | 5/1997 | Chang et al. | 345/335 |
| 5,765,187 | 6/1998 | Shimizu et al. | 711/110 |
| 5,809,557 | 9/1998 | Shemla et al. | 711/173 |
| 5,857,088 | 1/1999 | Keith et al. | 395/386 |
| 5,860,119 | 1/1999 | Dockser | 711/156 |

OTHER PUBLICATIONS

Michael F. Maas et al., U.S.S.N. 08/919,999 Circuit(s) Method(s) and Architecture for Providing Multiple Data Output Streams from a Data Input Stream, filed Aug. 28, 1997.

Cypress CY7C408A, CY7C409A, 64×8 Cascadable FIFO, 64×9 Cascadable FIFO, Jul. 1994, pp. 1–16.

*Primary Examiner*—Thomas C. Lee
*Assistant Examiner*—Ilwoo Park
*Attorney, Agent, or Firm*—Christopher P. Maiorana, P.C.

[57] ABSTRACT

A buffer comprising a plurality of storage elements, a write pointer configured to indicate a particular storage element to write data received from an input data stream and a plurality of read pointers, each configured to indicate a particular data location to read data from to generate a number of output data streams. The input data stream and the output data streams may be part of a data communications device.

21 Claims, 6 Drawing Sheets

FIG. 1

NORMAL

FIG. 2

FIG. 3 OVERFLOW

FIG. 4 UNDERFLOW

```
always @(state or readPointer[0] or writePointer[0]
            or direction)
case(state)
 PHASE45:
  if(readPointer[0] && !writePointer[0])
   begin
    newDirection = 0;
    newState = PHASE315;
   end
  else if(!readPointer[0] && writePointer[0])
   begin
    newDirection = 1;
    newState = PHASE135;
   end
  else if(!readPointer[0] && !writePointer[0])
   begin
    newDirection = direction;
    newState = PHASE225;
   end
  else
   begin
    newDirection = direction;
    newState = PHASE45;
   end
 PHASE135:
  if(readPointer[0] && writePointer[0])
   begin
    newDirection = 0;
    newState = PHASE45;
   end
  else if(!readPointer[0] && !writePointer[0])
   begin
    newDirection = 1;
    newState = PHASE225;
   end
  else if(readPointer[0] && !writePointer[0])
   begin
    newDirection = direction;
    newState = PHASE315;
   end
  else
   begin
    newDirection = direction;
    newState = PHASE135;
   end PHASE225:
  if(!readPointer[0] && writePointer [0])
   begin
    newDirection = 0;
    newState = PHASE135;
   end
  else if(readPointer[0] && !writePointer[0])
   begin
    newDirection = 1;
    newState = PHASE315;
   end
  else if(readPointer[0] && writePointer[0])
   begin
    newDirection = direction;
    newState = PHASE45;
   end
  else
   begin
    newDirection = direction;
    newState = PHASE225;
   end
 PHASE315:
  if(!readPointer[0] && !writePointer[0])
   begin
    newDirection = 0;
    newState = PHASE225; end
  else if(readPointer[0] && writePointer[0])
   begin
    newDirection = 1;
    newState = PHASE45;
   end
  else if(!readPointer[0] && writePointer [0])
   begin
    newDirection = direction;
    newState = PHASE135;
   end
  else
   begin
    newDirection = direction;
    newState = PHASE315;
   end
endcase
```

FIG.10

SYSTEM FOR GENERATING BUFFER STATUS FLAGS BY COMPARING READ AND WRITE POINTERS AND DETERMINING DIRECTION OF PROGRESSION OF READ POINTER WITH RESPECT TO WRITE POINTER

FIELD OF THE INVENTION

The present invention relates to buffers generally and, more particularly, to a buffer for providing a number of output streams from a single input stream.

BACKGROUND OF THE INVENTION

Buffers are used to coordinate the data streams of two devices operating at different speeds. Conventional first-in first-out (FIFO) buffers (or circular buffers) may employ status flags to indicate when particular boundary conditions (such as full, empty, almost full, almost empty, overflow, underflow, etc.) are present. When a particular boundary condition is present, the status flags may disable the reading and/or writing of information to or from the buffer. However, in applications where it is not convenient to simply stop reading and/or writing to the buffer, such as in an Ethernet repeater where the buffer is in the data stream, certain design constraints may change such as the ability to retrieve information from a different layer of the Ethernet protocol and/or the inability to simply stop the input or output data stream.

It is generally necessary to detect overflow and underflow conditions in a circular buffer. Conventional solutions to detecting overrun and underrun conditions employ some type of counting scheme. A counter may be updated dynamically as data is written to or read from the buffer. For example, a counter may keep track of the number of unoccupied locations in the data buffer. If the number of occupied locations falls to a predetermined value approaching zero, a signal indicating that the data buffer is "almost empty" is presented. If the number of occupied locations becomes large, reaching a predetermined value close to the storage capacity of the data buffer, a signal indicating a buffer is "almost full" is presented. Using such conventional counting methods, logic must be implemented to keep track of the up/down counting function. The design must manage the complexities of a single counter controlled and clocked simultaneously from two clock domains. As a result, such conventional counters grow in proportion to the number of address locations in the data buffer.

SUMMARY OF THE INVENTION

The present invention concerns a buffer comprising a plurality of storage elements, a write pointer configured to indicate a particular storage element to write data received from an input data stream and a plurality of read pointers, each configured to indicate a particular data location to read data from to generate a number of output data streams. The input data stream and the output data streams may be part of a data communications device.

The objects, features and advantages of the present invention include providing (i) a buffer in a data stream having a single input that may provide a multiple number of output ports while using a single set of data buffers storage elements and (ii) an overrun detection scheme that does not require conventional counters to monitor the state of the buffer.

BRIEF DESCRIPTION OF THE DRAWINGS

These and other objects, features and advantages of the present invention will be apparent from the following detailed description and the appended claims and drawings in which:

FIG. 10 is a verilog HDL description of the transitions of the state machine of FIG. 7.

DETAILED DESCRIPTION OF THE PREFERRED EMBODIMENTS

The present invention concerns an architecture for a data buffer having a single write pointer and write input while employing a multiple number of independently timed read pointers and an equal number of output read ports. Each read pointer may be tracked with respect to the write pointer to detect overrun conditions (e.g., overflow and underflow) that may occur for the particular output stream. A multiple number of output data streams are thereby produced from a single set of data buffer storage elements.

Figure 1:
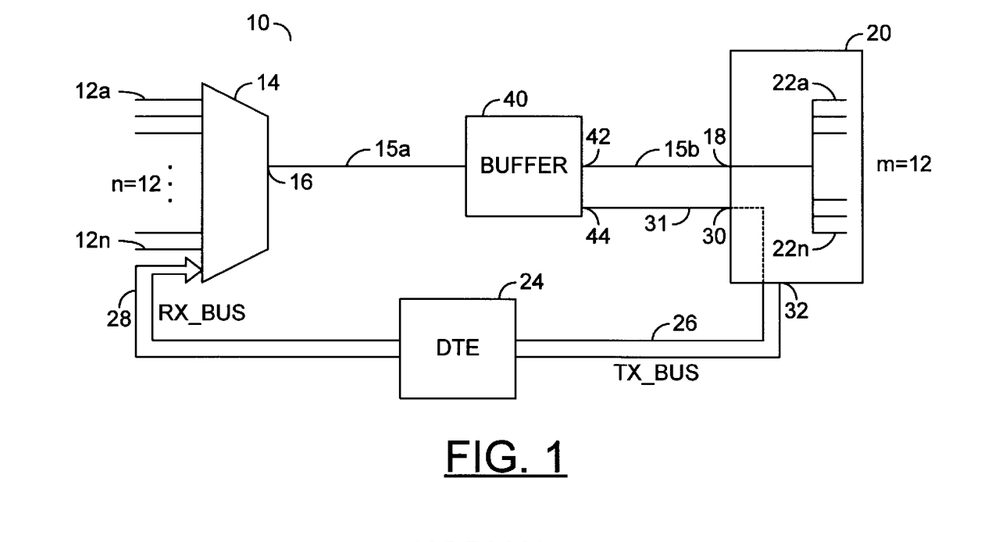
FIG. 1 is a block diagram of an Ethernet repeater having a command port implementing a buffer in accordance with an embodiment of the present invention.

Referring to FIG. 1, a block diagram of an Ethernet repeater 10 is shown. The Ethernet repeater 10 generally comprises a number of inputs 12a–12n that may be presented to a multiplexer 14. Each of the inputs 12a–12n may operate at a unique time base. The multiplexer 14 presents a signal at an output 16 to a shared bus 15a coupled by a buffer 40 which may facilitate re-timing of the signals received at the inputs 12a–12n. A shared bus 15b may be coupled to the buffer 40 and may present a signal to an input 18 of a demultiplexer circuit 20. The signal received at the input 18 is then presented to a number of outputs 22a–22n.

In a system implementing an additional command port 24 (or Digital Terminal Equipment (DTE) port), an additional transmit bus TX_BUS 26 and an additional received bus RX_BUS 28, may be provided. The DTE port 24 may be a dedicated port for connecting a workstation directly to the Ethernet repeater 10 to allow direct control. This direct connection may be in contrast to a workstation that is connected to the hub through the shared bus 15a and 15b. Since the DTE port 24 may be connected directly to the Ethernet repeater 10, a separate time domain is generally required. The time domain for the first read pointer is generally equal to the fundamental clock of the Ethernet (e.g., in the case of 100baseT, a 25 MHZ clock). The time base for the DTE port 24 may be a function of the frequency of oscillation of the workstation connected to the DTE port 24.

The addition of the transmit bus 26 and the receive bus 28 generally requires that the same signal that is presented at the output 16 also be presented to an input 30 of the block 20 via a bus 31. The signal received at the input 30 may be presented to the transmit bus 26 through an output 32. The rate of data transmission on the transmit bus 26 may be a different rate than the rate of data transmission of the signal received at the input 18. As a result, the buffer 40 may be presented having an output 42 and an output 44. The buffer 40 may be implemented as a circular buffer such as a FIFO buffer. The output 42 and the output 44 may present a data stream that, while relatively similar, may be received by a device having a different speed clock (or time base). In a data transmission environment, such as the Ethernet repeater 10, it is generally not convenient (or practical) to merely stop the input data stream or the output data stream. As a result, the buffer 40 generally has slightly different design criteria than a typical buffer. The status flags in the buffer 40 may indicate that data being read is invalid and may require recovery by another layer of the Ethernet protocol.

Figure 2:
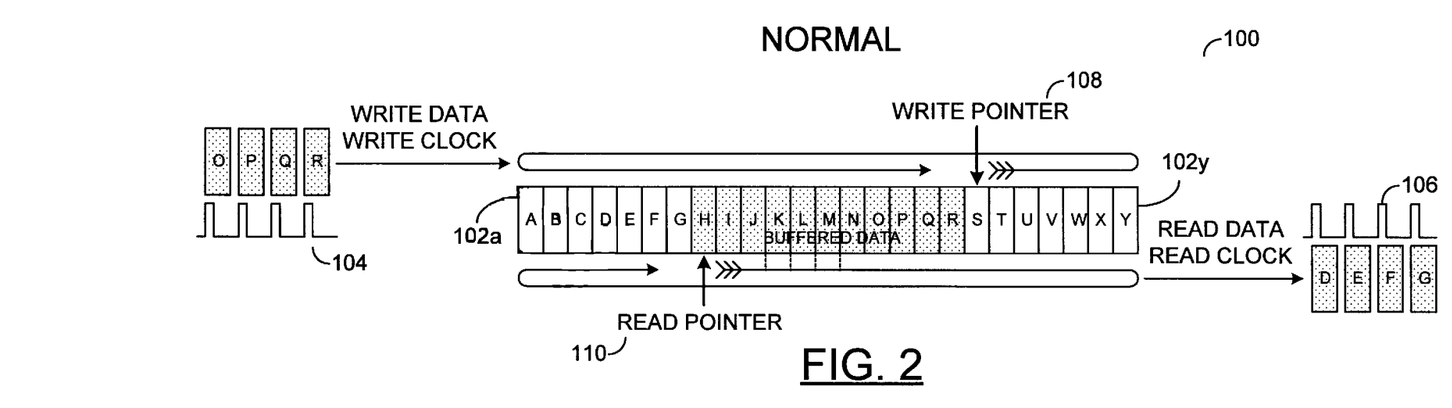
FIG. 2 is a diagram illustrating an example of a normal operation of the read and write pointers in a typical buffer.

Referring to FIG. 2, a diagram of the buffer 40 illustrating a normal operation is shown. The buffer 40 generally comprises a number of memory cells 102a–102y. A waveform 104 generally represents an incoming data stream presented to the buffer 40 while a waveform 106 generally illustrates a waveform read from the buffer 40. Information received from the waveform 104 is written to particular memory cells 102a–102y as determined by the position of a write pointer 108. In one example, the write pointer 108 is shown pointing to the memory location 102s. A read pointer 110 generally follows the write pointer 108 and presents data to the output data stream 106. The data stored in the memory cells (e.g., 102h–102r shaded in FIG. 2) between the write pointer 108 and the read pointer 110 generally represents the buffered data and should be sufficient to allow the write pointer 108 to stay ahead of the read pointer 110, even if the output data stream 106 has to pause (or slow down) for a predetermined amount of time.

In the example of FIG. 2, the write pointer is shown located at the memory cell 102s while the read pointer is shown located at the memory cell 102h. During such a condition, valid buffer data may be stored in the memory cells 102h–102r. The memory cells 102a–102g and the memory cells 102s–102y generally have data that has already been read since the read pointer 110 has already passed. This may allow the write pointer 108 to allow the overwriting of the previously read (and now invalid) data.

Figure 3:
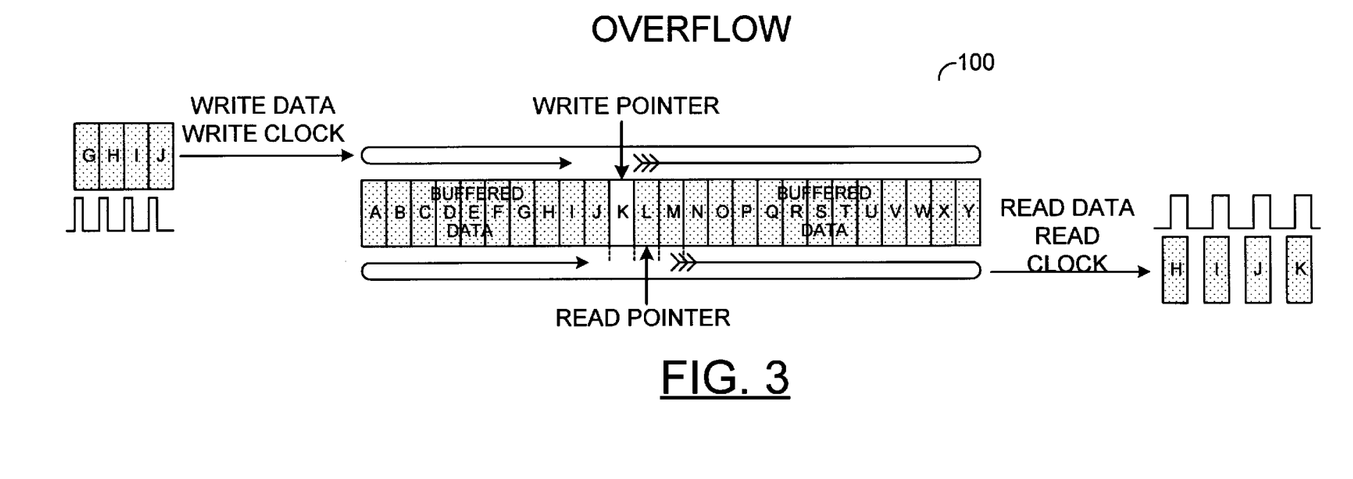
FIG. 3 is a diagram illustrating an example of an overflow condition between the read and write pointers of a buffer.

Referring to FIG. 3, the buffer 40 is shown illustrating an overflow condition. An overflow condition may occur when the write pointer 108 circles back from the last memory cell, in this case 102y, back to the first memory cell, in this case 102a, and then catches up to the read pointer 110. In this example, the write pointer 108 is shown located at the memory cell 102k while the read pointer 110 is shown located at the memory cell 102L. If the next write occurs before the next read occurs, data may be written to the memory cell 102L before the previously written data has been read. This condition of overwriting otherwise valid data is called an overflow condition, and is generally undesirable in a circular buffer since otherwise valid data may be lost when written over.

Figure 4:
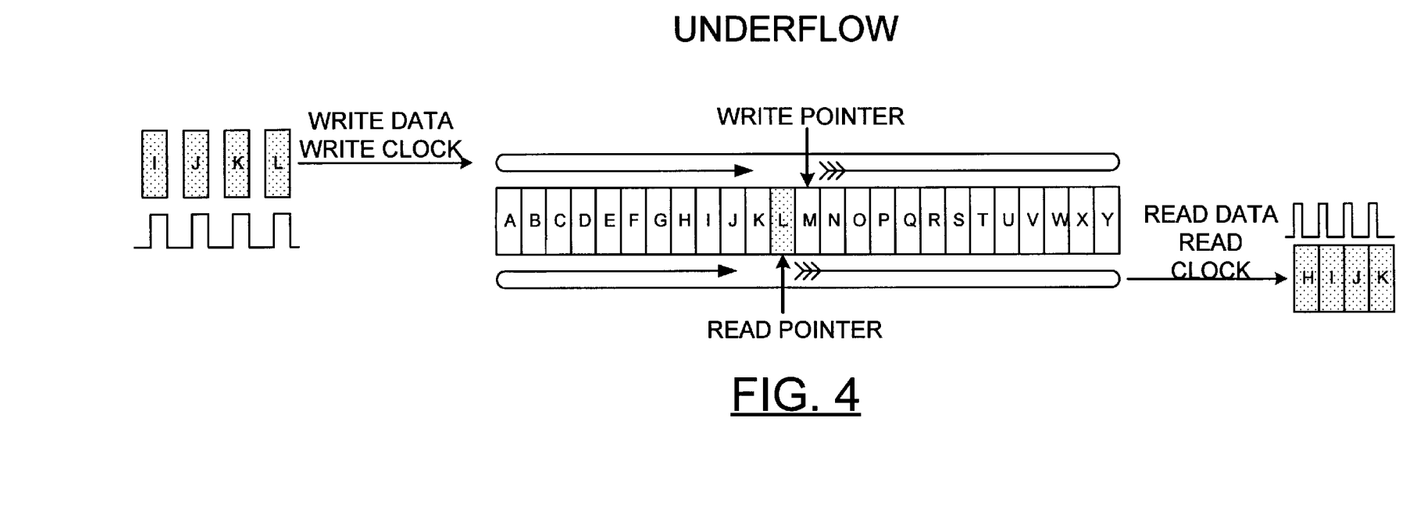
FIG. 4 is a diagram illustrating an example of an underflow condition between the read and write pointers of the buffer.

Referring to FIG. 4, the buffer 40 is shown illustrating an underflow condition. The read pointer 110 is shown having only a single piece of information to be read from the memory cell 102L. The write pointer 108 has not yet allowed information to be written to the memory cell 102m. As a result, if the next read occurs before the next write, data will be read that is not valid, since the write pointer 108 has not yet allowed information to be written to the buffer 40. An underflow condition must generally be accommodated for by a status flag or other device which may disable the progression of the read pointer 110 for an amount of time necessary to allow the write pointer 108 to advance or "catch up", or may indicate that the data presented from the buffer 40 is not valid. The status flags associated with underflow and overflow conditions may be implemented in a variety of ways. For example, see U.S. Pat. No. 5,627,979, the appropriate sections which are hereby incorporated by reference.

The Ethernet repeater 10 shown in FIG. 1 may require a single buffer 40 having multiple read pointers. In such a design environment, independent overrun/underrun detection circuits may be necessary for each of the read pointers. As a result, the complexity of the overrun detection circuitry must be kept to a minimum in order to ensure that the overall die area consumed by the buffer 40 and overrun detection circuitry does not interfere with the implementation the Ethernet repeater 10.

Figure 5:
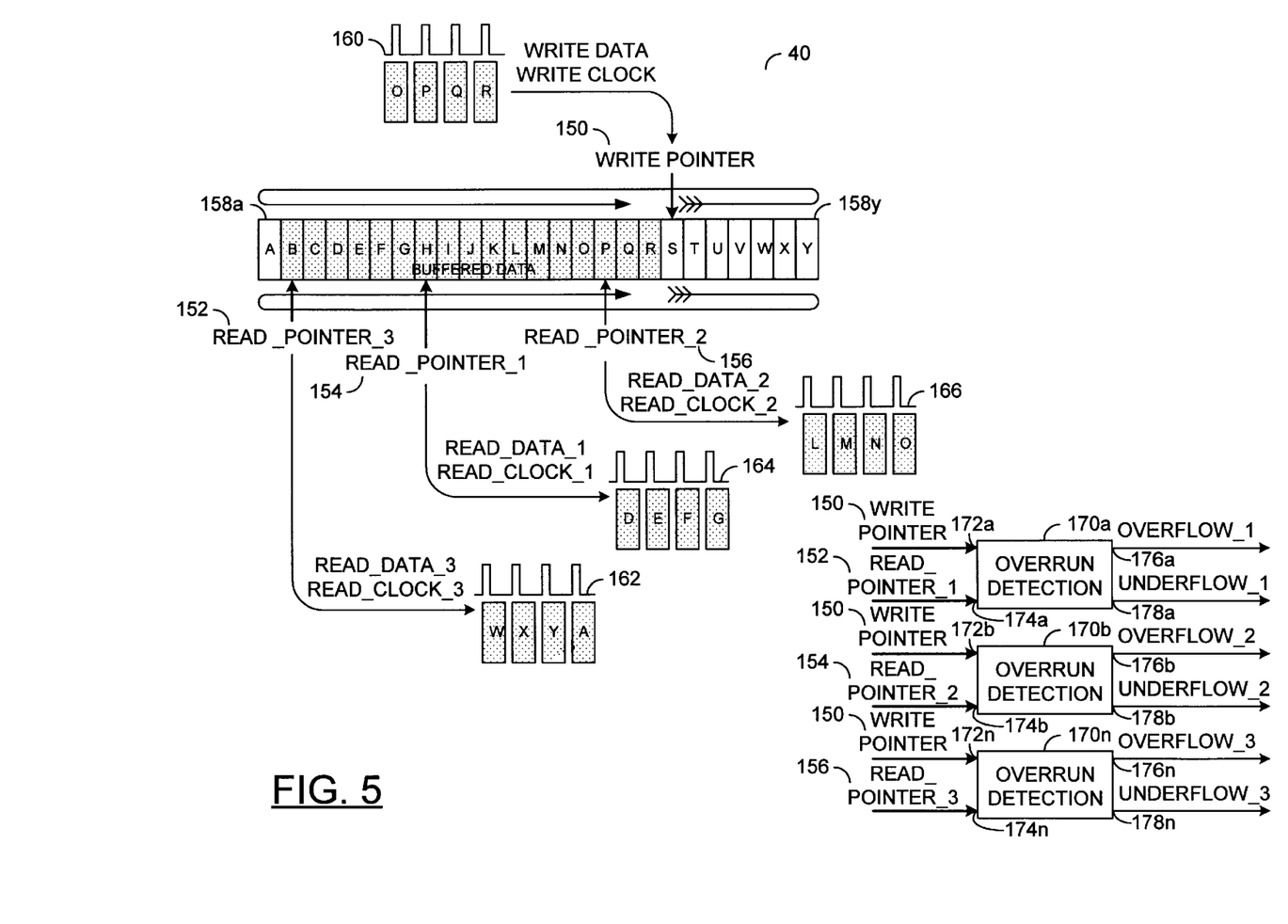
FIG. 5 is a diagram illustrating a single write pointer and a multiple number of read pointers implemented with a single set of data storage elements.

Referring to FIG. 5, the buffer or FIFO 40 is shown implementing a write pointer 150, a read pointer 152 (e.g., Read_Pointer_3), a read pointer 154 (e.g., Read_Pointer_1), a read pointer 156 (e.g., Read_Pointer_2), and a number of memory cells 158a–158y. The particular number of memory cells 158a–158y implemented may be adjusted accordingly to meet the design criteria of a particular application. The write pointer 150 generally indicates a portion of the memory cells 158a–158y for which data received from an input data stream 160 may be written. The read pointer 152 generally indicates a portion of the memory cells 158a–158y for which an output waveform 162 may be read. Similarly, the read pointer 154 generally indicates a portion of the memory cells 158a–158y for which an output waveform 164 may be read. The read pointer 156 has a similar operation to the read pointers 152 and 154 in that it indicates a particular portion of the memory cells 158a–158y for which an output waveform 166 may be read.

The FIFO 40 also comprises a number of overrun detection circuits 170a–170n. The overrun detection circuit 170a has an input 172a that may receive the write pointer 150 and an input 174a that may receive the read pointer 152. The overrun detection circuit 170a generally comprises an output 176a that may present a signal, such as a status flag, that indicates when an overflow condition between the write pointer 150 and the read pointer 152 occurs. The output 178a generally provides a signal, such as a flag, that indicates when an underflow condition occurs between the write pointer 150 and the read pointer 152. The overrun detection circuits 170b through 170n provide similar inputs and outputs. In particular, the overrun detection circuit 170b has an input 172b that may receive the write pointer 150, an input 174b that may receive the read pointer 154, an output 176b that may present a signal, such as a flag, when an overflow condition occurs between the write pointer 150 and the read pointer 154, and an output 178b that may present an output flag signal when an underflow condition occurs between the write pointer 150 and the read pointer 154. The overrun detection circuit 170n has an input 172n that may receive the write pointer 150 and an input 174n that may receive the read pointer 156. The outputs 176n and 178n may provide signals during an overflow and underflow condition between the write pointer 150 and the read pointer 156.

The FIFO buffer 40 generally provides the output data streams 162, 164, and 166 derived from a single input data stream 160 while using a single set of memory cells (or storage elements) 158a–158y. As a result, a multiple number of independently timed outputs may be generated. Each of the read pointers 152, 154, and 156 may be tracked with a respect to the common write pointer 150 to detect overrun conditions for that particular output stream.

Essentially, the output having the fastest transmit clock will determine which of the read pointers may reach the underflow condition, while the output having the slowest transmit clock will determine which of the read pointers may reach the overflow condition. As a result, the read pointers 152, 154, and 156 are related in the sense that (i) each of the pointers generally follows the overflow and underflow constraints and (ii) all of the pointers, as a collective group, generally follows the overflow and underflow constraints generally allowing each of the transmit streams to remain valid.

Figure 6:
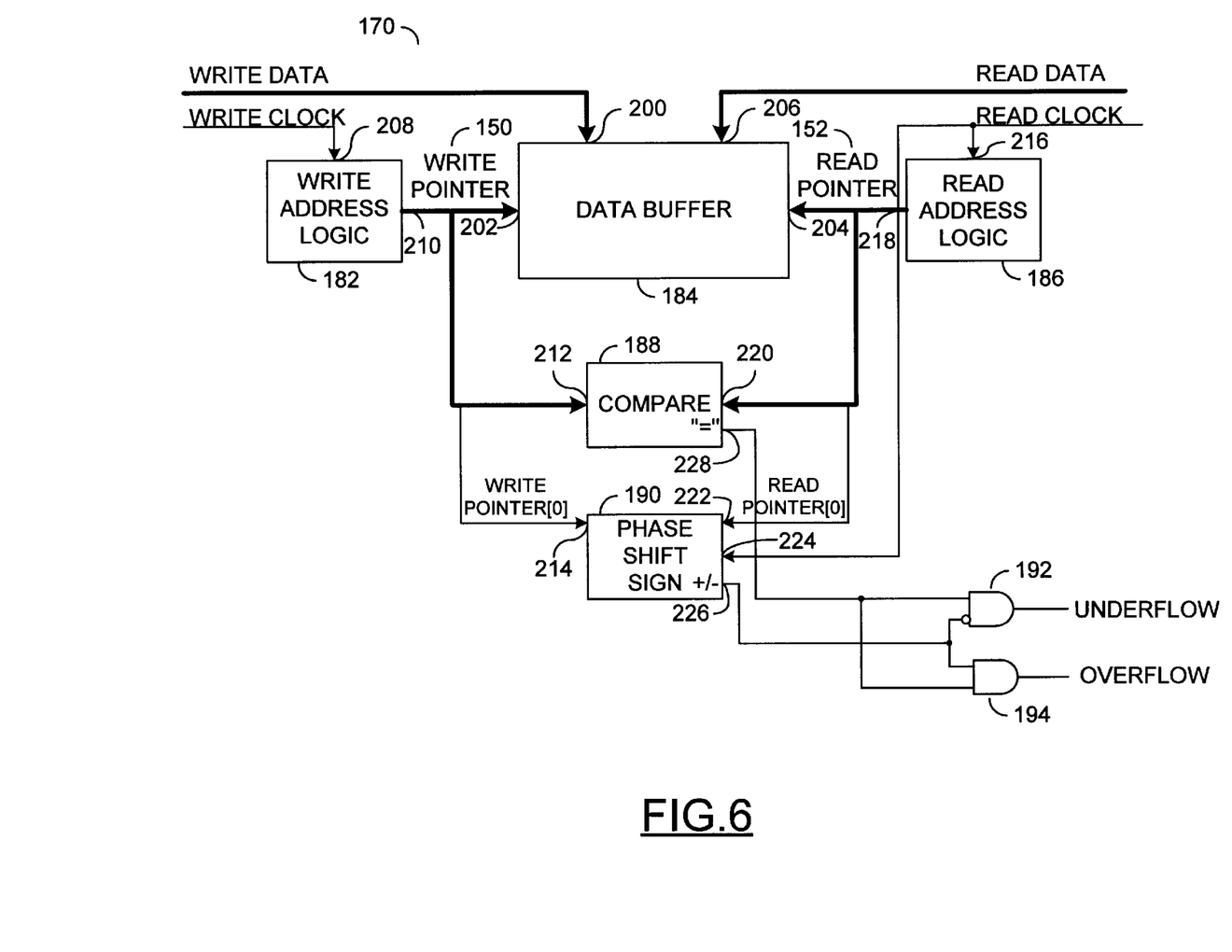
FIG. 6 is a block diagram of an alternate embodiment of present invention implementing an underflow/overflow detection circuit.

Referring to FIG. 6, a more detailed diagram of one of the overrun detection circuits 170a–170n is shown comprising a write address logic block (or circuit) 182, a data buffer 184, a read address logic block (or circuit) 186, a compare block (or circuit) 188, a phase shift sign block (or circuit) 190, a gate 192 and a gate 194. The data buffer 184 comprises an input 200 for receiving an input signal (e.g., write data), an input 202 which may receive the write pointer signal 150, an input 204 which may receive one of the read pointer signals 152 (or 154 or 156 of FIG. 5) and an output 206 which may present a read data output. The write address logic block 182 generally comprises an input 208 that may receive an externally generated write clock.

The write address logic 182 and the read address logic 186 generally present the write pointer 150 and the read pointer 152 (or 154 or 156) that sequentially progress through each of the storage elements 158a–158y in a non-repetitive pattern. The non-repetitive pattern may be implemented as a sequence that skips certain memory cells 158a–158y. Specifically, the sequential progression may, in one example, progress from memory cell 158d, to 158k to 158t, etc., such that each of the memory cells 158a–158y are addressed prior to the repeating of the sequential pattern. The circuit of FIG. 5 shows the additional nomenclature for the memory cells as a–y, which generally accounts for the progression through the memory cells 158a–158y. For example, the memory cell a may not be physically located next to the memory cell b. However, for purposes of explanation, FIG. 5 shows the locations of the memory cells as being adjacent. In certain design applications, it may be desirable for the progression through the memory cells 158a–158y to skip certain cells. One such example may include the ability to dynamically adjust the size of the buffer according to certain design constraints. Another example may involve the production of a single buffer to be used in a variety of design applications where one or more small buffers may be implemented from a larger buffer. Another example may include the elimination of memory cells that do not pass a post-production test from the progression.

The write address logic 182 generally comprises an output 210 that generally presents the write pointer to the input 202 of the data buffer 184 as well as to an input 212 of the compare circuit 188. The sequential progression of the read pointer 152 (or 154 or 156) and the write pointer 150 through the storage elements 158a–158y may be represented as a progression of binary values. The following TABLE 1 illustrates such a progression using a five bit counter to progress through twenty four memory cells 158a–158x. However, other counters may be used to present other combinations required for particular design considerations.

TABLE 1

|   | 4 | 3 | 2 | 1 | 0 |
|---|---|---|---|---|---|
| a | 0 | 0 | 0 | 0 | 0 |
| b | 0 | 0 | 0 | 0 | 1 |
| c | 0 | 0 | 0 | 1 | 1 |
| d | 0 | 0 | 0 | 1 | 0 |
| e | 0 | 0 | 1 | 1 | 0 |
| f | 0 | 0 | 1 | 1 | 1 |
| g | 0 | 0 | 1 | 0 | 1 |
| h | 0 | 0 | 1 | 0 | 0 |
| i | 0 | 1 | 1 | 0 | 0 |
| j | 0 | 1 | 1 | 0 | 1 |
| k | 0 | 1 | 1 | 1 | 1 |
| l | 0 | 1 | 1 | 1 | 0 |
| m | 1 | 1 | 1 | 1 | 0 |
| n | 1 | 1 | 1 | 1 | 1 |
| o | 1 | 1 | 1 | 0 | 1 |
| p | 1 | 1 | 1 | 0 | 0 |
| q | 1 | 0 | 1 | 0 | 0 |
| r | 1 | 0 | 1 | 0 | 1 |
| s | 1 | 0 | 1 | 1 | 1 |
| t | 1 | 0 | 1 | 1 | 0 |
| u | 1 | 0 | 0 | 1 | 0 |
| v | 1 | 0 | 0 | 1 | 1 |
| w | 1 | 0 | 0 | 0 | 1 |
| x | 1 | 0 | 0 | 0 | 0 |

TABLE 1 specifies a gray code counting sequence implemented in a preferred embodiment of the write address logic 182 and the read address logic 186. The gray code sequence may be implemented such that only a single bit of the five bits changes during the progression between two adjacent numbers. The first row labeled 4, 3, 2, 1, and 0 provides the particular bit of the write pointer 150 or read pointer 152 (or 154 or 156). The bit 0 generally represents the sequence for the signal ReadPointer[0] and the signal WritePointer[0]. The implementation of a gray code sequence may reduce the tendency of a glitch condition to occur. However, certain other sequences may be used accordingly to meet the design criteria of a particular application. Specifically, if a non-gray code sequence were used, filtering may be provided at the output of the phase shift sign circuit 190 to compensate for any glitches that may occur. Furthermore, a semi-gray sequence may be used where portions of the sequence are implemented as a gray code sequence, while other portions demonstrate transitions where more than one bit change occurs during a particular transition. Such a semi-gray code sequence may be used where certain known transitions are known to not cause a glitch condition, or may only a cause a minor glitch which may be accommodated by minor filtering.

The read address logic 186 generally comprises an input 216 for receiving an externally generated read clock and an output 218 for presenting the read pointer signal to the input 204 of the data buffer 184 as well as to an input 220 of the compare circuit 188. A single bit of the read pointer may be presented to an input 222 of the phase shift sign circuit 190. The phase shift sign circuit 190 may be implemented as a state machine to be described in more detail in connection with FIG. 7. An input 224 of the phase shift sign circuit 190 generally receives the externally generated read clock. The phase shift sign circuit 190 also has an output 226 that presents a signal to both the gate 192 and the gate 194. An output 228 of the compare block 188 presents a signal to both the gate 192 and the gate 194. The signal presented at the output 226 of the circuit 190 is generally presented to an inverted input of the gate 192. As a result, the gate 192 presents a signal indicating an underflow condition, while the gate 194 presents a signal indicating an overflow condition.

The overrun detection circuit 170 generally operates by recognizing the difference between an "almost empty" and "almost full" condition, without the reliance on specifically counting the number of pulses of the data input and the data output. Generally, to trigger an overrun condition, the phase relationship between the write data presented at the input 200 and data received from the output 206 changes over time. By building a phase detection circuit that monitors this phase change, a signal representing the sign of this change may be developed, which dynamically indicates which overrun condition is approaching. In addition, a simple equivalence comparison of the read and write addresses expressed and implemented in gray code can be used to trigger an overrun condition. A more detailed description of the particular sign history of the detection circuit will be described in connection with FIG. 7.

The phase shift sign computation is generally implemented as a four-state logic. In the examples shown in FIG. 6, the circuit 190 is synchronously clocked by the read data clock. The inputs 214 and 222 may be received directly from the least significant bit (LSB) of the gray code counters (e.g., the write address logic 182 and the read address logic 184) used for data buffer addressing. A signal WritePointer[0] received at the input 214 may be re-timed to the read data clock. A signal ReadPointer[0] may be received at the input 222. The gray code address sequence imposes a divide by four functionality on the gray code (LSBs). As a result, the sampling clock (the read clock in this particular example) will generally not miss a transition of the phase detector inputs. The write clock, an external reference clock, or other appropriate clock may be used to synchronize the overrun detection circuit 170.

Figure 7:
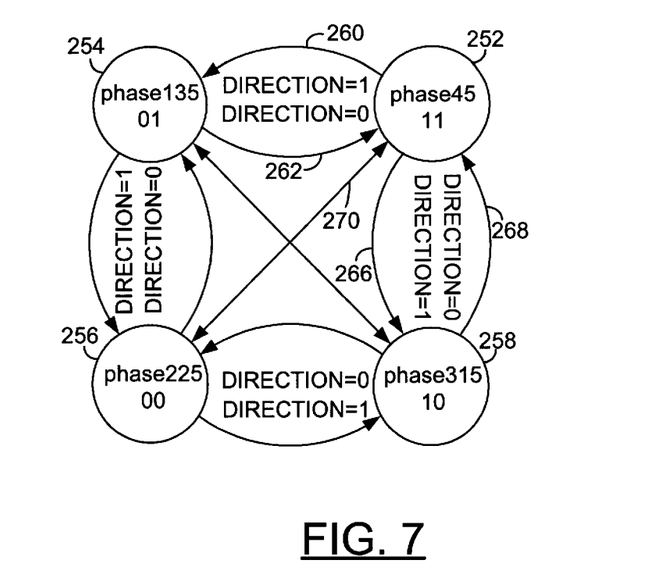
FIG. 7 is a diagram of a state machine according to the embodiment of FIG. 6.

Referring to FIG. 7, a state machine 191 is shown implementing the logic of the phase shift sign block 190. The state machine 191 tracks a changing phase in relationship of the signal WritePointer[0] with respect to the signal ReadPointer[0]. As a result, the output of the phase shift sign block 190 determines the direction in which the state machine 191 is traversing the particular states. The state logic acts as a phase detector, responding to a transition on either input. The input transitions determine the particular order of the state transitions, which in turn determines the direction.

The state machine 191 generally comprises a phase45 state 252, a phase135 state 254, a phase225 state 256 and a phase315 state 258. The state 252 may also be represented by the binary reference 11, the state 254 may also be represented by the binary reference 01, the state 256 may also be represented by the binary reference 00 and the state 258 may also be represented by the binary reference 10. The state machine 191 generally represents a configuration such that any particular state 252–258 may progress to any other particular state 252–258 in a generally direct fashion. Specifically, the state 252 has an exit 260 allowing progression to the state 254 as well as an entry 262 to return from the state 254. Similarly, an exit 268 and a corresponding entry 266 connect the state 252 to the state 258. An entry/exit 270 allows the progression between the state 252 and state 256. The states 254, 256 and 258 have similar configurations with the remaining states.

Figure 8:
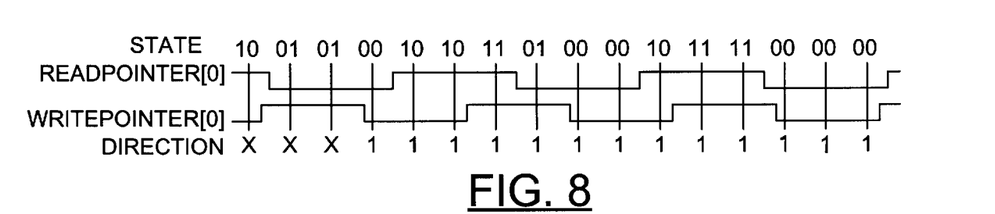
FIG. 8 is a timing diagram illustrating particular transitions of the state machine of FIG. 7.
Figure 9:
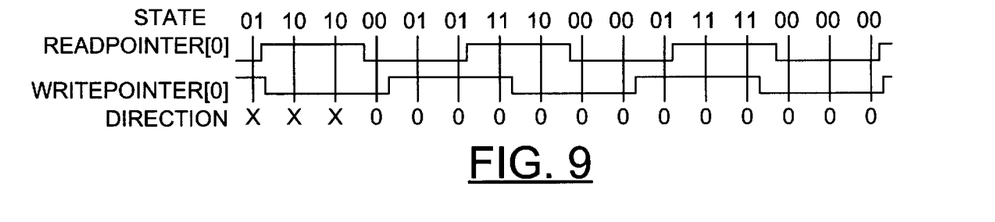
FIG. 9 is a timing diagram illustrating additional transitions of the state machine of FIG. 7.

Referring to FIGS. 8 and 9, two input sequences are shown that illustrate the detection of the sign of the output 226 presented by the state machine 190. In both figures, values for state are expressed in binary, while values for the direction are expressed as a scalar. FIG. 8 illustrates the state and direction progression for the case where the signal ReadPointer[0] has a frequency less than that of the signal WritePointer[0]. FIG. 9 illustrates the state and direction progression for the case where the signal ReadPointer[0] has a frequency greater than that of the signal WritePointer[0].

The syntax of FIG. 10 is understood to be an example of verilog hardware description language (HDL) as defined by the IEEE 1364-1995 standard. While the code illustrated in FIG. 10 explicitly defines certain conditions, other implementations, including, but not limited to, discrete logic components, may be implemented to meet the design criteria of a particular application.

Referring to FIG. 10, the "case(state)" construct causes evaluation to pass to the section representing the current state of the circuit 190. For example, if the current state is PHASE315 (binary 10), then the code evaluation starts at the label "PHASE315:" and the other sections are ignored. Within the section, e.g., "PHASE315:" the else/if construct is evaluated sequentially using current values of state, and inputs. The first true conditional associated parenthetically to an "if( . . . )" or "else if( . . . )" causes the procedure immediately following to be executed. If none of the conditionals is true, the procedure following the "else" construct is executed. A procedure is generally defined as a sequence of value assignments enclosed in a begin/end pair. When the values for code and state have been modified according to the procedure indicated by current state, input values, the evaluation passes back to the "case(state)" for re-evaluation with updated state and input values. The "!" symbol means negation in the logical sense. The symbols "&&" and "||" mean logical AND and logical OR, respectively. For example, notation for the three bit binary quantity "code" can be expressed in the following equivalence code={[code[2],code[1],code[0]}. "1'b0" is an example of a one bit binary constant having a logic 0 value. The operator "~^" means logical EXCLUSIVE NOR of the operands.

While the invention has been particularly shown and described with reference to the preferred embodiments thereof, it will be understood by those skilled in the art that various changes in form and details may be made without departing from the spirit and scope of the invention.

I claim:

1. An apparatus comprising:
   an array comprising (i) a plurality of storage elements, (ii) a write pointer configured to indicate a particular one of said plurality of storage elements to write data received from an input data stream, and (iii) a read pointer configured to indicate a particular one of said plurality of storage elements to read data to generate an output data stream;
   a compare circuit configured to provide a first output indicating said read pointer is in the same storage element as said write pointer, said first output generated in response to said read pointer and said write pointer;
   a state machine configured to present a second output indicating a direction of a progression of the read pointer with respect to a progression of the write pointer, said second output generated in response to (i) a bit of said write pointer and (ii) a bit of said read pointer; and
   an output circuit configured to present one or more status flags indicating boundary conditions in response to (i) said first output and (ii) said second output.

2. The apparatus according to claim 1, wherein said progressions of said read pointer and said write pointer each comprise a sequential progression wherein each (i) sequentially progress through each of said plurality of storage elements in a non-repetitive pattern and (ii) repeat the sequential progression through said plurality of storage elements.

3. The apparatus according to claim 2, wherein said sequential progression is represented as a progression of binary values.

4. The apparatus according to claim 3, wherein only a single bit of said binary values changes during each of said progressions.

5. The apparatus according to claim 3, wherein said binary progression comprises a gray code progression.

6. The apparatus according to claim 2, wherein said status flag indicates said progression of said read pointer is invalid.

7. The apparatus according to claim 6, wherein said output circuit comprises a gate.

8. The apparatus according to claim 1, wherein said output circuit generates a first status flag indicating an underrun condition and a second status flag indicating an overrun condition.

9. A FIFO buffer comprising:

an array comprising a plurality of storage elements;

a write pointer configured to indicate a particular one of said plurality of storage elements to write data received from an input data stream;

a plurality of read pointers configured to indicate a particular one of said plurality of storage elements to read data to generate a plurality of output data streams, wherein said input data stream and said plurality of output data streams are part of a data stream of a communication device; and a plurality (i) compare circuits, (ii) state machines and (iii) output circuits according to claim 1.

10. An apparatus comprising:

memory means comprising (i) a plurality of storage elements, (ii) write pointer means configured to indicate a particular one of said plurality of storage elements to write data received from an input data stream, and (iii) a plurality of read pointer means, each configured to indicate a particular one of said plurality of storage elements to read data to generate a plurality of output data streams;

means for generating a first output indicating said read pointer is in the same storage element as said write pointer, said first output generated in response to said read pointer and said write pointer;

means for generating a second output indicating a direction of a progression of said read pointer with respect to a progression of said write pointer, said second output generated in response to (i) a bit of said write pointer and (ii) a bit of said read pointer; and means for generating one or more status flags indicating boundary conditions in response to (i) said first output and (ii) said second output.

11. The apparatus according to claim 10, wherein said progression of said read pointer and said write pointer each (i) sequentially progress through each of said plurality of storage elements in a non-repetitive pattern and (ii) repeat the sequential progression through said plurality of storage elements.

12. The apparatus according to claim 11, wherein said sequential progression is represented as a progression of binary values.

13. The apparatus according to claim 12, wherein a single bit of said binary values changes during each progression.

14. The apparatus according to claim 12, wherein said progression comprises a gray code progression.

15. The apparatus according to claim 11, wherein said status flag indicates said progression of said read pointer in said plurality of storage elements is invalid.

16. The apparatus according to claim 10, wherein said means for generating a status flag comprises a gate.

17. A method for generating a status flag comprising the steps of:

generating a first output indicating a write pointer is in the same row as a read pointer, wherein said read and write pointer progress through a plurality of storage elements;

prior to generating said first output, generating a second output in response to a direction of the progression of said read pointer with respect to said write pointer; and generating said status flag in response to said first and second outputs.

18. The method according to claim 17, wherein said progression of said read pointer and said write pointer each (i) sequentially progress through each of said plurality of storage elements in a non-repetitive pattern and (ii) repeat the sequential progression through said plurality of storage elements.

19. The method according to claim 17, wherein said sequential progression is represented as a progression of binary values.

20. The method according to claim 17, wherein said progression comprises a gray code progression.

21. The circuit according to claim 9, wherein each of the plurality of read pointers and the write pointer follow the overflow and underflow constraints of each of said underflow and overflow flags.

* * * * *